US006463455B1

(12) United States Patent
Turner et al.

(10) Patent No.: US 6,463,455 B1
(45) Date of Patent: Oct. 8, 2002

(54) METHOD AND APPARATUS FOR RETRIEVING AND ANALYZING DATA STORED AT NETWORK SITES

(75) Inventors: Cameron R. Turner, Seattle; Thomas P. Blumer, Clyde Hill, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/223,696

(22) Filed: Dec. 30, 1998

(51) Int. Cl.[7] .............................................. G06F 15/16
(52) U.S. Cl. ..................... 709/200; 709/203; 709/217; 709/229; 707/3; 707/10; 707/205
(58) Field of Search ................................. 709/200–203, 709/206–207, 217–219, 223–226, 227–229; 707/1–5, 9–10, 100–104, 500–501, 200–205

(56) References Cited

U.S. PATENT DOCUMENTS

| 5,659,732 A |   | 8/1997  | Kirsch ........................... 707/5   |
|-------------|---|---------|-------------------------------------------|
| 5,666,526 A | * | 9/1997  | Reiter et al. .................... 707/2  |
| 5,678,041 A | * | 10/1997 | Baker et al. ................. 709/229    |
| 5,855,015 A |   | 12/1998 | Shoham .......................... 707/5   |
| 5,884,304 A | * | 3/1999  | Davis, III et al. ............... 707/4   |
| 5,918,010 A | * | 6/1999  | Appleman et al. .......... 709/203        |
| 5,918,013 A | * | 6/1999  | Mighdoll et al. ........... 709/217       |
| 5,948,054 A | * | 9/1999  | Nielsen ....................... 709/200   |
| 5,963,944 A | * | 10/1999 | Adams ......................... 707/10    |
| 6,073,167 A | * | 6/2000  | Poulton et al. ............. 709/217      |
| 6,154,745 A | * | 11/2000 | Kari et al. ................... 707/100   |
| 6,182,122 B1| * | 1/2001  | Berstis ....................... 709/217   |

FOREIGN PATENT DOCUMENTS

DE    196 51 788 A 1    6/1998 ........... G06F/17/30

OTHER PUBLICATIONS

Baldazo, R., "Navigating with a Web Compass," *Byte*, Mar. 1, 1996, vol. 21, No. 3, pp. 97–98, XP 000600179.

Douglis, F., et al., "The AT&T Internet Difference Engine: Tracking and Viewing Changes on the Web," AT&T Labs—Research Technical Report #97.23.1, Apr. 14, 1997, XP–002135690.

Montebello, M., et al., "Optimizing Recall/Precision scores in IR over the WWW," Proceedings of the 21st Annual International ACM SIGIR Conference on Research and Development in Information Retrieval, Melbourne, Australia, 1998, pp. 361–362, XP–002135685.

\* cited by examiner

*Primary Examiner*—Bharat Barot
(74) *Attorney, Agent, or Firm*—Christensen O'Connor Johnson Kindness PLLC

(57) ABSTRACT

A network analyzer is provided that searches all of the sites of a network, such as the Internet, contained in a site list and analyzes the analysis criteria. The site list may be specified by a user, randomly generated, or retrieved from a file. The analysis criteria may be default analysis criteria, retrieved from a file, or created by the user. After the site list and analysis criteria have been specified, a file, such as the HTML file, at each of the specified sites is downloaded and stored as a text file. The site is analyzed for number of occurrences and/or sizes of analysis criteria data. After all of the sites on the site list have been analyzed, the results are displayed. Results of an analysis may be compared to results of a previous analysis in order to track trends.

30 Claims, 15 Drawing Sheets

StatCrawler Web Elements Query

2  This Query was prepared by CturnerMandiraV
3  This Query was initiated on 7/30/97
4  Start Time: 4:02:04 PM
5  Source of URLs: Randomly Generated
6  Number of Sites to Try (note, site not listed on error): 1000

Search Results:

| # | Name | URL | blink | code | dfn | listing |
|---|---|---|---|---|---|---|
| 10 | Name | URL | blink | code | dfn | listing |
| 11 | #bifemcafe | http://www.calweb.com/~darkmoon/bifemcat | 0 | 0 | 0 | 0 |
| 12 | ~angleym at www.mindspring.com | http://www.mindspring.com/~angleym/ | 0 | 0 | 0 | 0 |
| 13 | ~apfulks at www.princeton.edu | http://www.princeton.edu/~apfulks/ | 2 | 0 | 0 | 0 |
| 14 | ~bobylak at www.princeton.edu | http://www.princeton.edu/~bobylak/ | 0 | 0 | 0 | 0 |
| 15 | ~ear104 at www.york.ac.uk | http://www.york.ac.uk/~ear104/ | 0 | 0 | 0 | 0 |
| 16 | ~gserratos at spin.com.mx | http://spin.com.mx/~gserratos/ | 0 | 0 | 0 | 0 |
| 17 | ~ncvernsw at www.peg.apc.org | http://www.peg.apc.org/~ncvernsw/ | 0 | 0 | 0 | 0 |
| 18 | ~shields at www.portals.pdx.edu | http://www.portals.pdx.edu/~shields/ | 0 | 0 | 0 | 0 |
| 19 | 1 A Animated Adult Video Cartoons -- If you a | http://animatedadultcartoons.com/ | | | | |
| 20 | 108 RESORT | http://netshop.net/~100mile/108rst.html | 4 | 4 | 0 | 0 |
| 21 | 1355 at www.geopages.com | http://www.geopages.com/capitolhill/1355/ | 0 | 0 | 0 | 0 |

Fig. 15.

METHOD AND APPARATUS FOR RETRIEVING AND ANALYZING DATA STORED AT NETWORK SITES

FIELD OF THE INVENTION

This invention relates generally to a method and computer-readable medium for analyzing data and, more specifically a method and computer-readable medium for analyzing data from a plurality of network sites.

BACKGROUND OF THE INVENTION

Internet crawlers query web sites in order to get index information and provide Internet search data. In the past, no tool has existed that adequately analyzes the data resulting from web crawlers querying web sites. In this regard, it is desirable for an Internet analysis tool to provide statistics about data found on Internet sites. Desirable statistics include such diverse information as the percentage of educational sites, the average amount of graphics per site, the average amount of hyper-links per site, etc.

An acceptable Internet analysis tool must be able to query a large volume of web sites, scan the hypertext markup language (HTML) files downloaded from the sites and provide results of analysis criteria based on the contents of the HTML files. The tool should be able to process large volumes of data without operator intervention. The present invention is directed to providing such a tool.

SUMMARY OF THE INVENTION

In accordance with the present invention, a method and computer-readable medium for analyzing network data, in particular Internet data, is provided. The method and computer-readable medium for analyzing network data comprises: obtaining the identity of one or more sites (web sites in the case of the Internet) to query; obtaining one or more query criteria; accessing the one or more sites; and analyzing the query criteria in the site data.

In accordance with another aspect of the present invention, the results of an Internet analysis are displayed.

In accordance with a further aspect of the present invention, the results of an Internet analysis are stored.

In accordance with yet another aspect of the present invention, the query criteria is determined by the user. Preferably, the user determined query criteria is saved for subsequent analyses.

In accordance with yet a further aspect of the present invention, a default set of query criteria is provided. Preferably the default query criteria is user modifiable, and the user can either save modified query criteria as the new default query criteria, or as a different query criteria, leaving the existing default criteria unchanged.

In accordance with still further aspects of the present invention, a user selects the sites (e.g., the Internet web sites) to be analyzed.

In accordance with an alternative aspect of the present invention, the sites to be analyzed are randomly selected. Preferably, the number of sites to be randomly selected is determined by the user.

In accordance with further alternative aspects of the present invention, an existing site list is used to identify the sites to be analyzed. Preferably , the user can modify and save the site list.

In accordance with further aspects of the present invention analyzing the query criteria can be accomplished by counting occurrences of the query criteria in the site data. Alternatively, analysis can be accomplished by determining the size of the data specified by the query criteria.

In accordance with another aspect of the present invention, Internet trends are tracked by performing the same analysis at different times. Trends tracking can be done manually or automatically.

In accordance with yet another aspect of the present invention, the time increment for automatic trends tracking is determined by the user, such as on a monthly basis.

In accordance with yet still another aspect of the present invention, occurrences of a text string are counted if found anywhere within the HTML file. Alternatively, occurrences are only counted if found in a specified HTML tag. For example, files containing <script> tags that have the "language" attribute where the attribute value is "javascript". The preceding example provides the user with the summary information regarding the number of files found during an analysis that include JavaScript. Alternatively, the count may be about the tag itself, for example how often bold text is included in HTML files.

In accordance with a further aspect of the present invention analysis is only performed on the sites specified in the site list. Alternatively, links found in the site can be followed and analysis can be performed on the linked sites as well as the sites referenced directly in the site list.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 15 is an exemplary display of the results produced by an Internet analysis performed in accordance with the present invention.

DETAILED DESCRIPTION OF THE PREFERRED EMBODIMENT

While the present invention was developed for use in analyzing web sites accessible via the Internet and is described in connection with this environment, it is to be understood that the invention can also be used in other network environments, particularly networks that employ hypertext markup language (HTML). For example, the present invention could be used to analyze local or wide area private networks.

Figure 1:
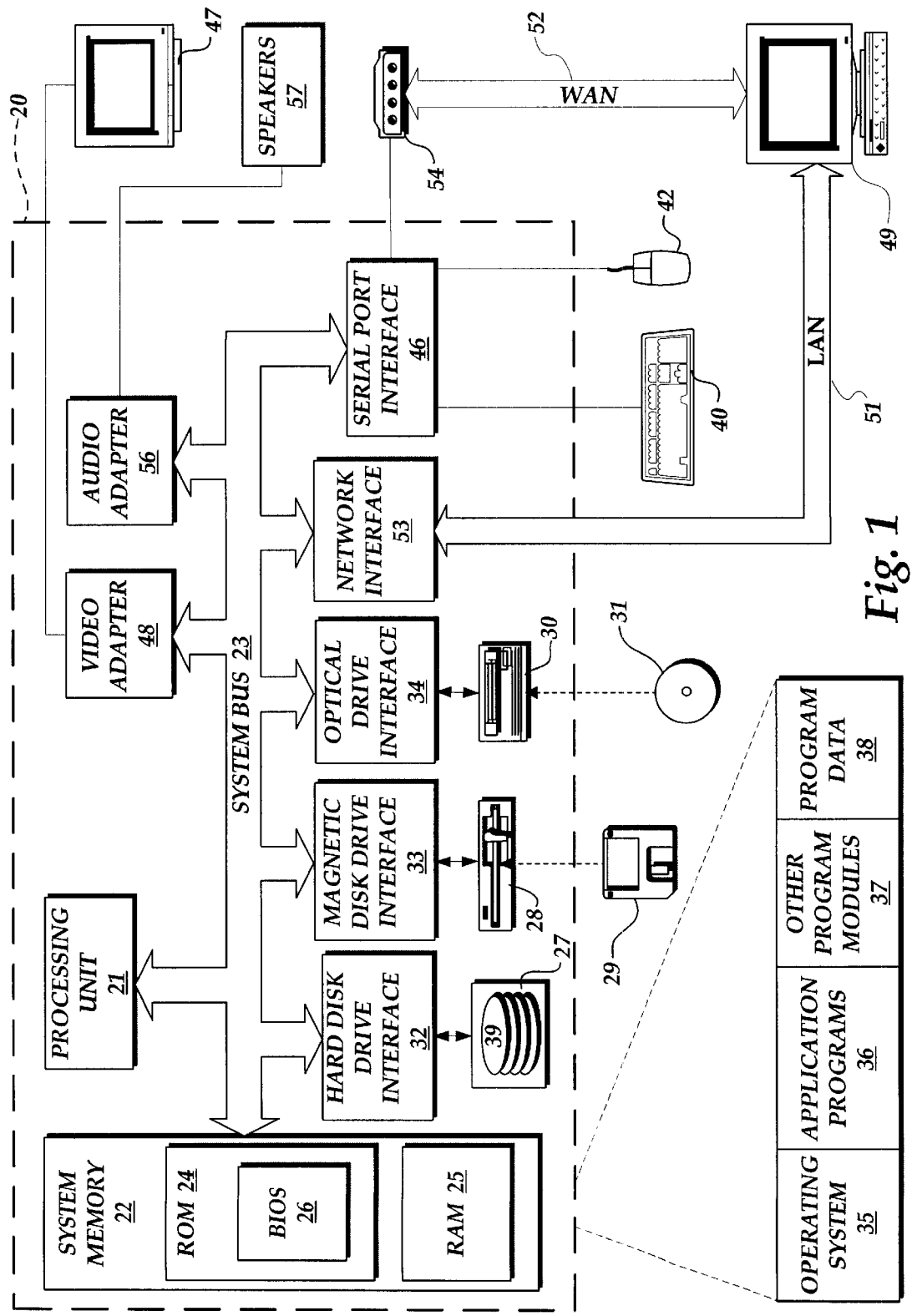
FIG. 1 is a block diagram of a general purpose computer system suitable. for analyzing data from Internet sites in accordance with the present invention.

FIG. 1 and the following discussion are intended to provide a brief, general description of a suitable computing world in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing worlds where tasks are performed by remote processing devices that are linked through a communications network. In a distributed computing world, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, or a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 further includes a hard disk drive 27 for reading from and writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary world described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating world.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus (USB). A display 47 is also connected to the system bus 23 via an interface, such as a video adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked world using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking worlds are commonplace in offices, enterprise-wide computer networks, intranets and the Internet.

When used in a LAN networking world, the personal computer 20 is connected to the local area network 51 through a network interface or adapter 53. When used in a WAN networking world, the personal computer 20 typically includes a modem 54 or other means for establishing communications over the wide area network 52, such as the Internet. The modem 54, which may be internal or external, is connected to the system bus 23 via the serial port interface 46. In a networked world, program modules depicted relative to the personal computer 20 or portions thereof, may be stored in the remote memory storage device. It will be appreciated that the network connections shown are exemplary, and other means of establishing a communications link between the computers may be used.

In order to perform an Internet analysis in accordance with the present invention, two parameters are required: (i) analysis criteria; and (ii) a list of sites from which the data to be analyzed is to be obtained. As will be better understood from the following discussion either or both parameters are user controllable. Alternatively, the analysis criteria may be preset and the list of sites randomly chosen. Other alternatives are also possible. In any event, after the required parameters are obtained, an Internet analysis is performed. In an actual embodiment of the present invention, an Internet analysis involves obtaining a count for each of the analysis criteria found at each of the sites on the site list. Alternatively, analysis can include the size of the analysis criteria, such as the size of a graphics file (e.g., a gif file) or the size of an HTML file.

Figure 2:
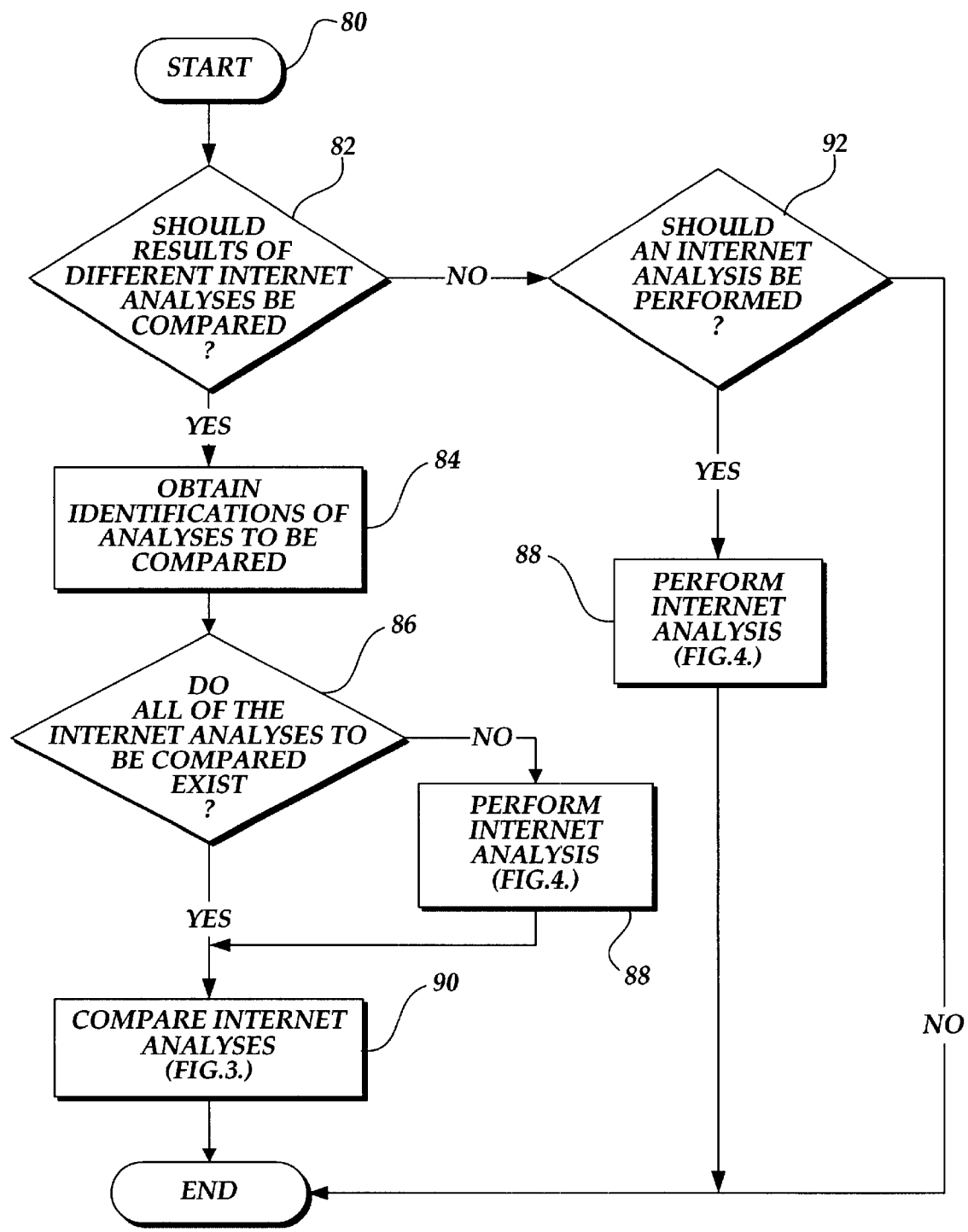
FIG. 2 is a flow diagram illustrating the overall logic used by the computer to analyze data from Internet sites in accordance with the present invention.

FIG. 2 is a flow diagram illustrating the overall logic used by an Internet analyzer program formed in accordance with the present invention to analyze data acquired from Internet sites. The logic begins in FIG. 2 in a block 80 and proceeds to a decision block 82 where a test is made to determine if the results of different Internet analyses should be compared. In an actual embodiment of the present invention, there are two mechanisms for performing comparisons of Internet analyses: automatic and manual. The automatic comparison of Internet analyses is performed based on a previous user request. In an actual embodiment of the present invention, the user specifies a time increment for performing comparisons of Internet analyses, such as monthly. Upon expiration of the specified time, a new Internet analyses is performed, and compared to the prior Internet analysis or analyses. This allows the user to track Internet trends. The automatic method can continue for an indefinite period of time. In contrast, the manual comparison only occurs one time. If it is determined that the results of different analyses should be compared, the logic proceeds to a block 84 where identifications of the analyses to be compared are obtained. In an actual embodiment of the present invention, if the comparison is automatic, the previously specified analyses criteria and site list are retrieved from memory 22. If the comparison is manual, a user interface requests the identification information. Preferably, the user interface includes a list of all existing analysis results data that are available for comparisons. The user can choose to compare existing analyses results, or the user may choose to compare the results of a new analysis against the results of an existing analysis. For trends tracking, it is preferable that the analysis criteria list and the site list to be compared be the same. An actual embodiment of the present invention requires that the analysis criteria and the site list to be compared be the same when comparing Internet analyses. After the analyses to be compared have been identified, the logic proceeds to a decision block 86 where a test is made to determine if all of the analyses to be compared currently exist. If all of the analyses to be compared exist, the logic proceeds to a block 90, where the analyses are compared.

Figure 3:
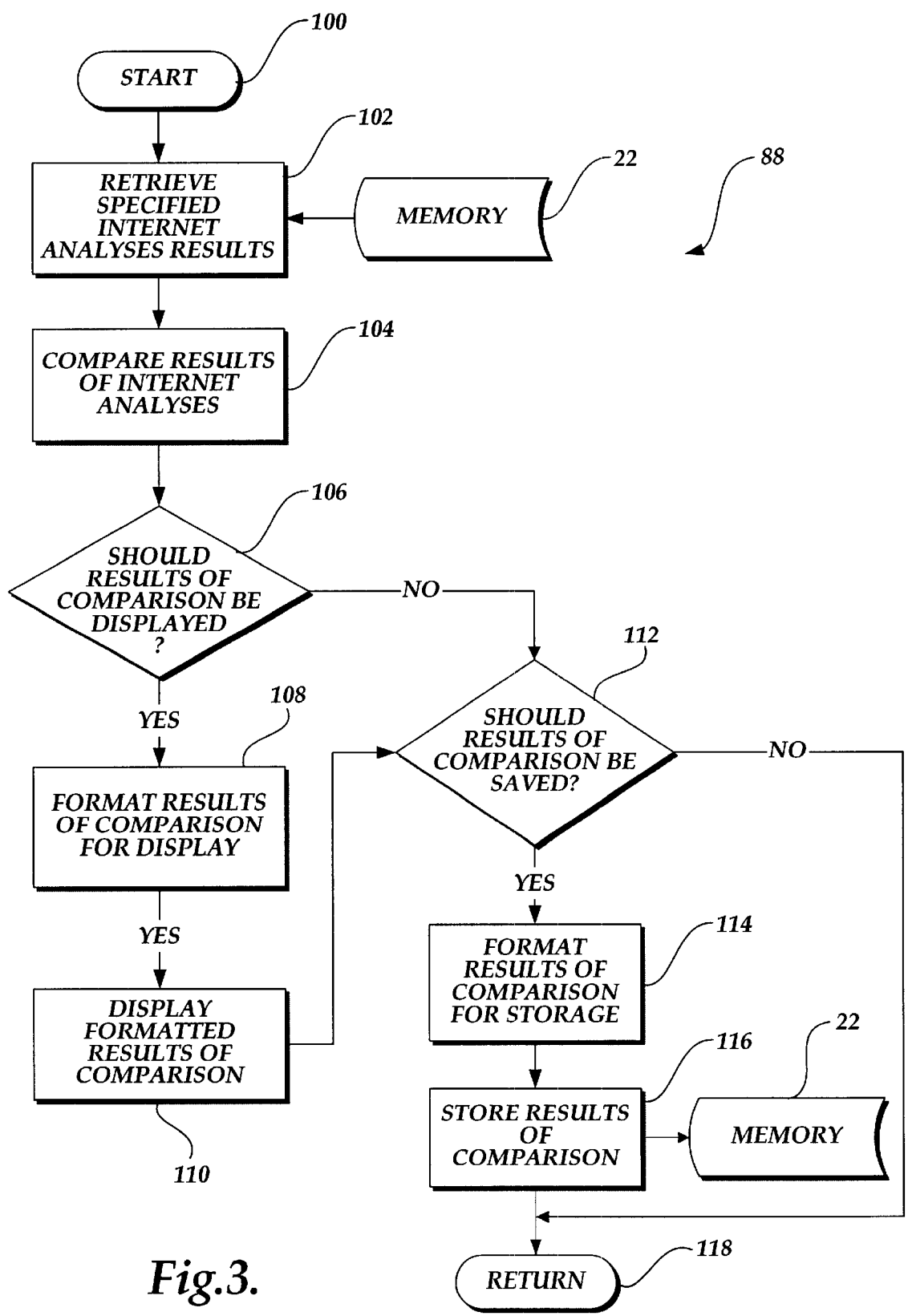
FIG. 3 is a flow diagram illustrating in detail the logic used to compare results of Internet analyses in accordance with the present invention.

FIG. 3 illustrates in detail the logic used to compare Internet analysis 90 results in accordance with the present invention. The logic begins in a block 100 and proceeds to a block 102 where the data from the results to be compared are retrieved from memory 22. The logic then proceeds to a block 104 where the retrieved results are compared to each other. After the results have been compared 104, the logic proceeds to a decision block 106 where a test is made to determine if the results of the comparison should be displayed. In an actual embodiment of the present invention, the results are always displayed. In an alternative embodiment, the user specifies whether the results should be displayed. If in decision block 106 it is determined that the results should be displayed, the logic proceeds to a block 108 where the results are formatted for display. It will be appreciated that the results can be displayed using a variety of formats. Formats for displaying comparison results include: displaying the actual values for each of the analysis criteria from each of the analyses; displaying delta values for each of the analysis criteria between analyses; displaying the change in number of occurrences as a percentage change; displaying the changes graphically, such as with a line graph illustrating the change in the number of occurrences of the analysis criteria. Once the results are formatted 108, the logic proceeds to a block 110 where the formatted results are displayed. Regardless of whether or not it is determined that the results of the comparison should be displayed in decision block 106, the logic proceeds to another decision block 112 where a test is made to determine if the results of the comparison should be stored. In an actual embodiment of the present invention, the user specifies whether the comparison results should be saved. Preferably, the user also specifies a name for storing the comparison results. If it is determined in decision block 112 that the results of the comparison should be stored, the logic proceeds to a block 114 where the results are formatted for storage. It will be appreciated that comparison results can be stored in a variety of formats. In an actual embodiment of the present invention, the results are stored in the same format as the display format. The formatted results are then stored in memory 22 in a block 116. After the comparison results have been displayed, if appropriate, and stored, if appropriate, the logic for comparing results of Internet analyses ends in a block 118.

Returning to FIG. 2, if in decision block 86 it is determined that all of the analyses to be compared do not exist, the logic proceeds from decision block 86 to a block 88 where an Internet analysis is performed.

Figure 4:
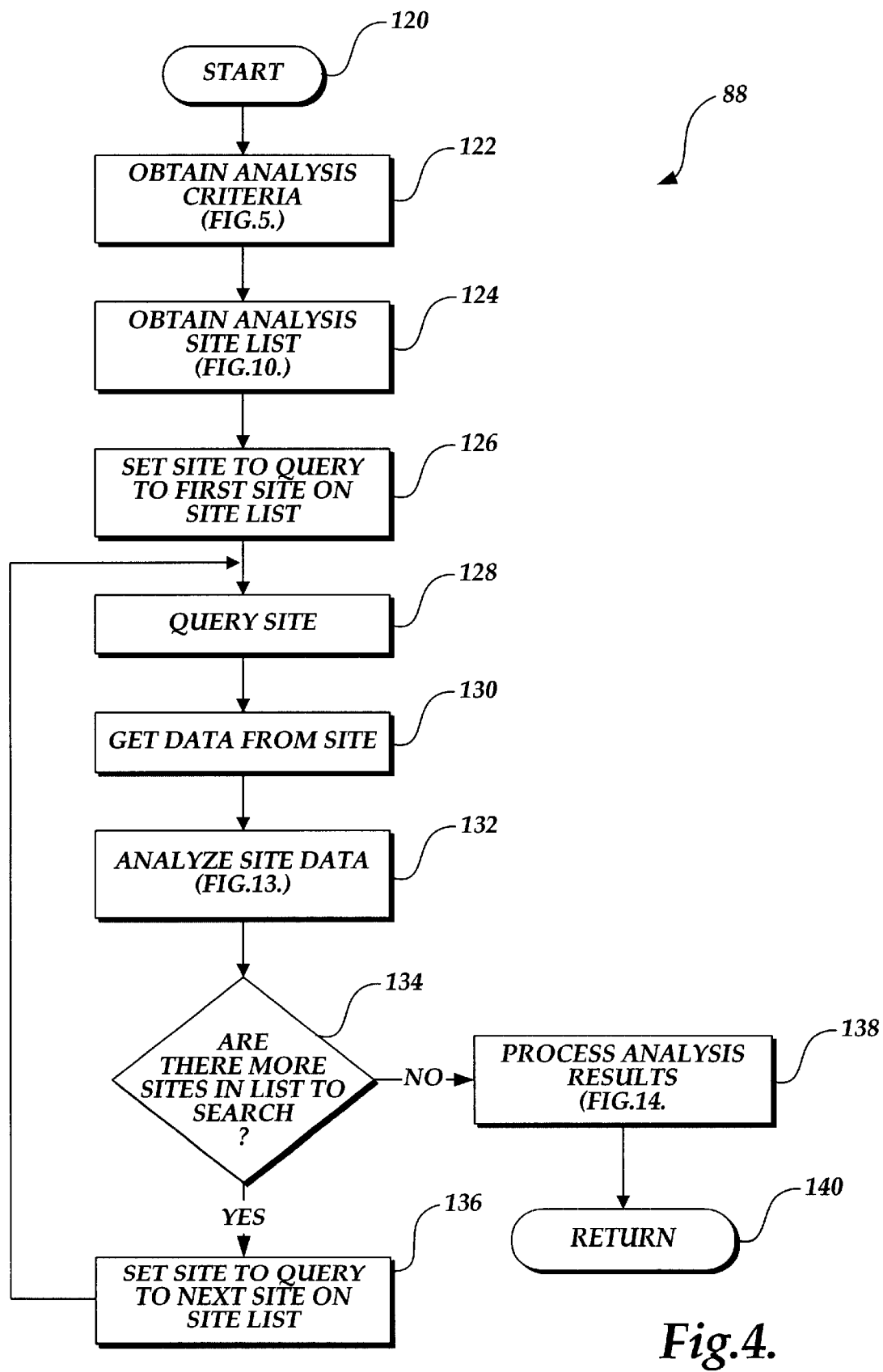
FIG. 4 is a flow diagram illustrating in detail the logic used to perform a new Internet analysis in accordance with the present invention.

The logic to perform an Internet analysis 88 is shown in detail in FIG. 4. The logic in FIG. 4 begins in a block 120 and proceeds to a block 122, where analysis criteria are obtained.

Figure 5:
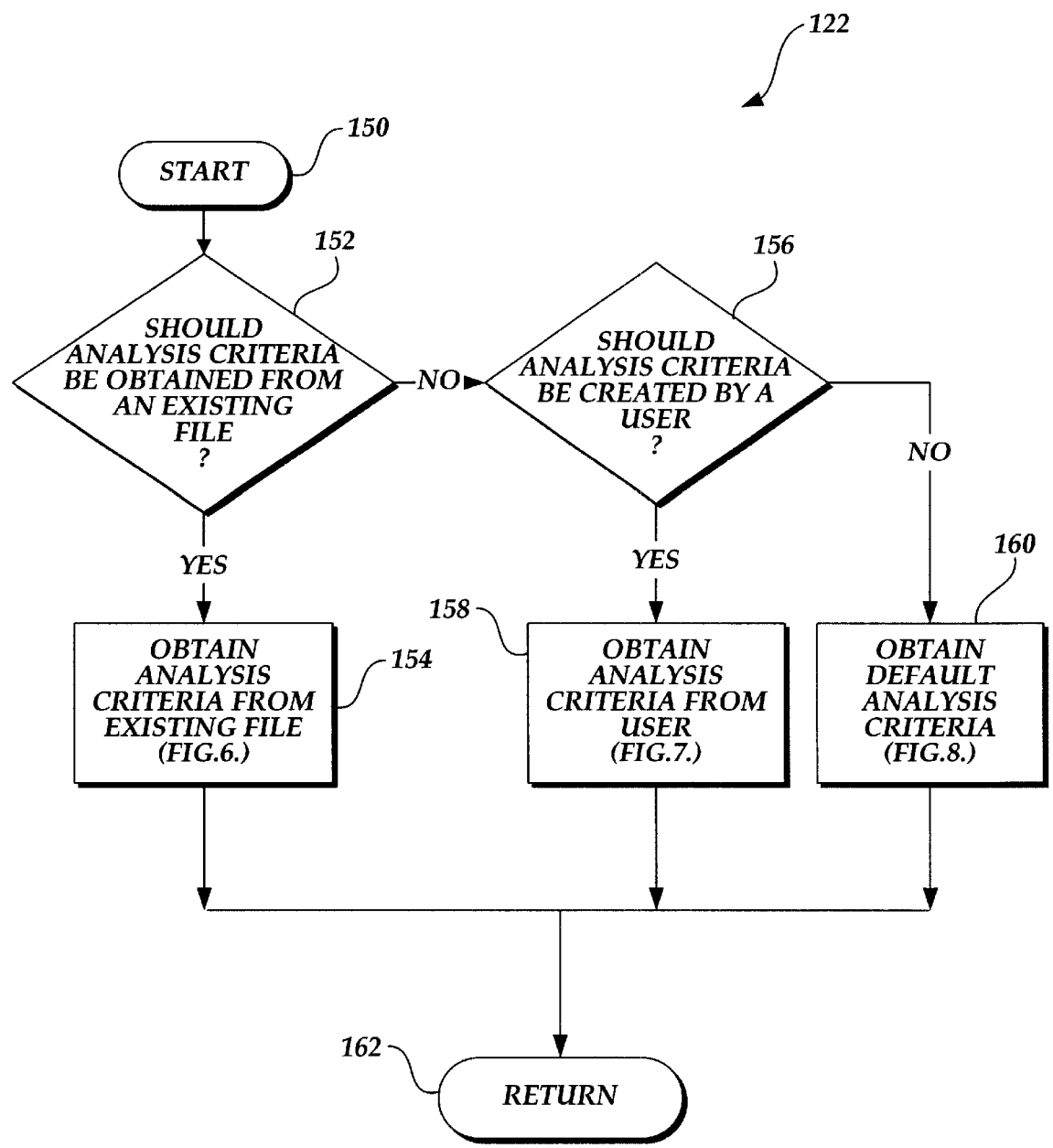
FIG. 5 is a flow diagram illustrating in detail the logic used to obtain analysis criteria.

In an actual embodiment of the present invention, a user determines how analysis criteria will be obtained. The user may choose from among the following: (i) obtain analysis criteria from an existing file; (ii) create new analysis criteria; or (iii) obtain default analysis criteria. The logic used to obtain analysis criteria 122 in accordance with the present invention is shown in detail in FIG. 5. The logic in FIG. 5 begins in a block 150 and proceeds to a decision block 152, where a test is made to determine if the analysis criteria should be obtained from an existing file. If in decision block 152 it is determined that the analysis criteria should be obtained from an existing file, the logic proceeds to a block 154, where the analysis criteria is obtained from an existing file.

Figure 6:
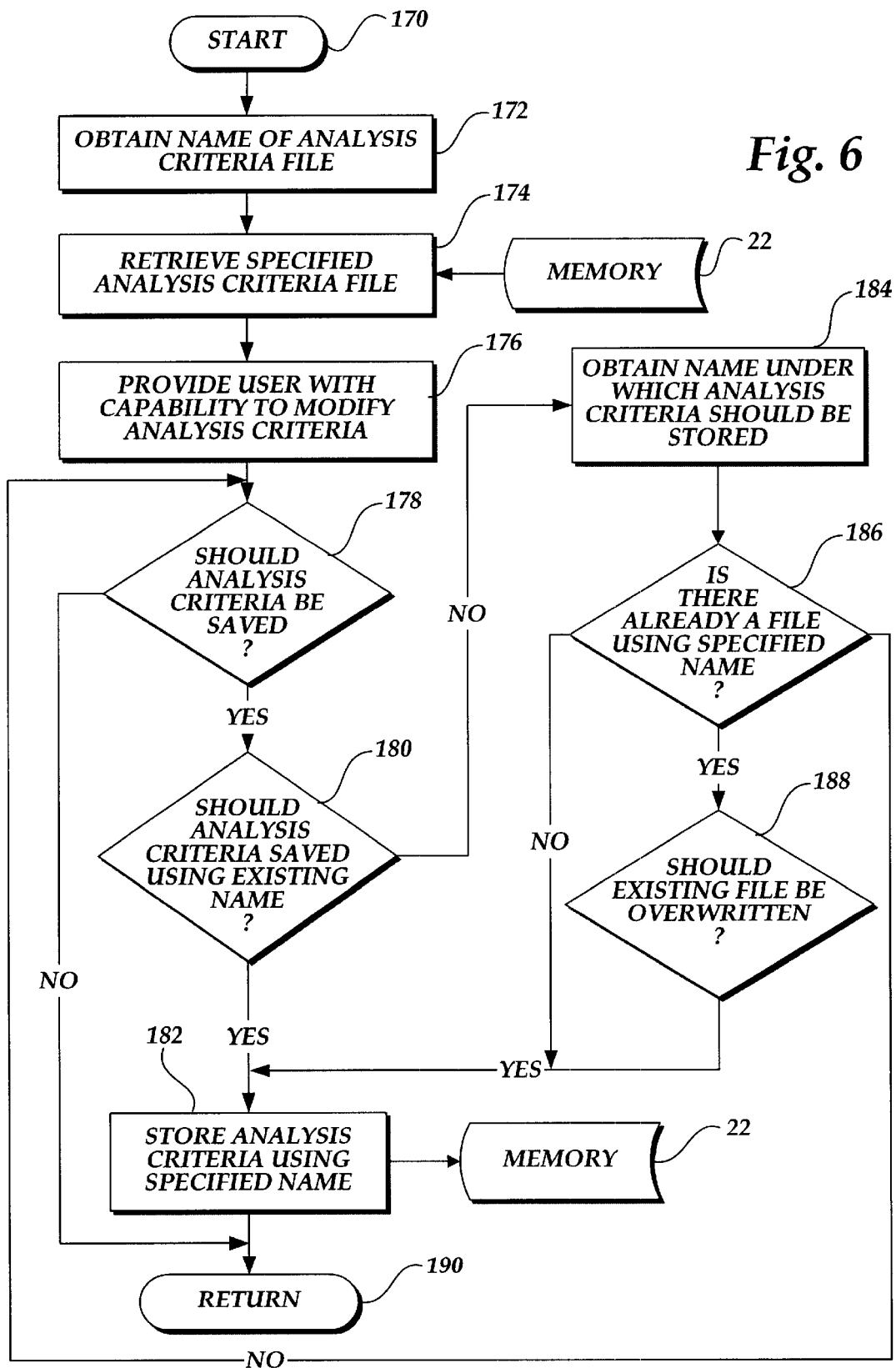
FIG. 6 is a flow diagram illustrating in further detail the logic used to obtain analysis criteria from an existing file.
Figure 9:
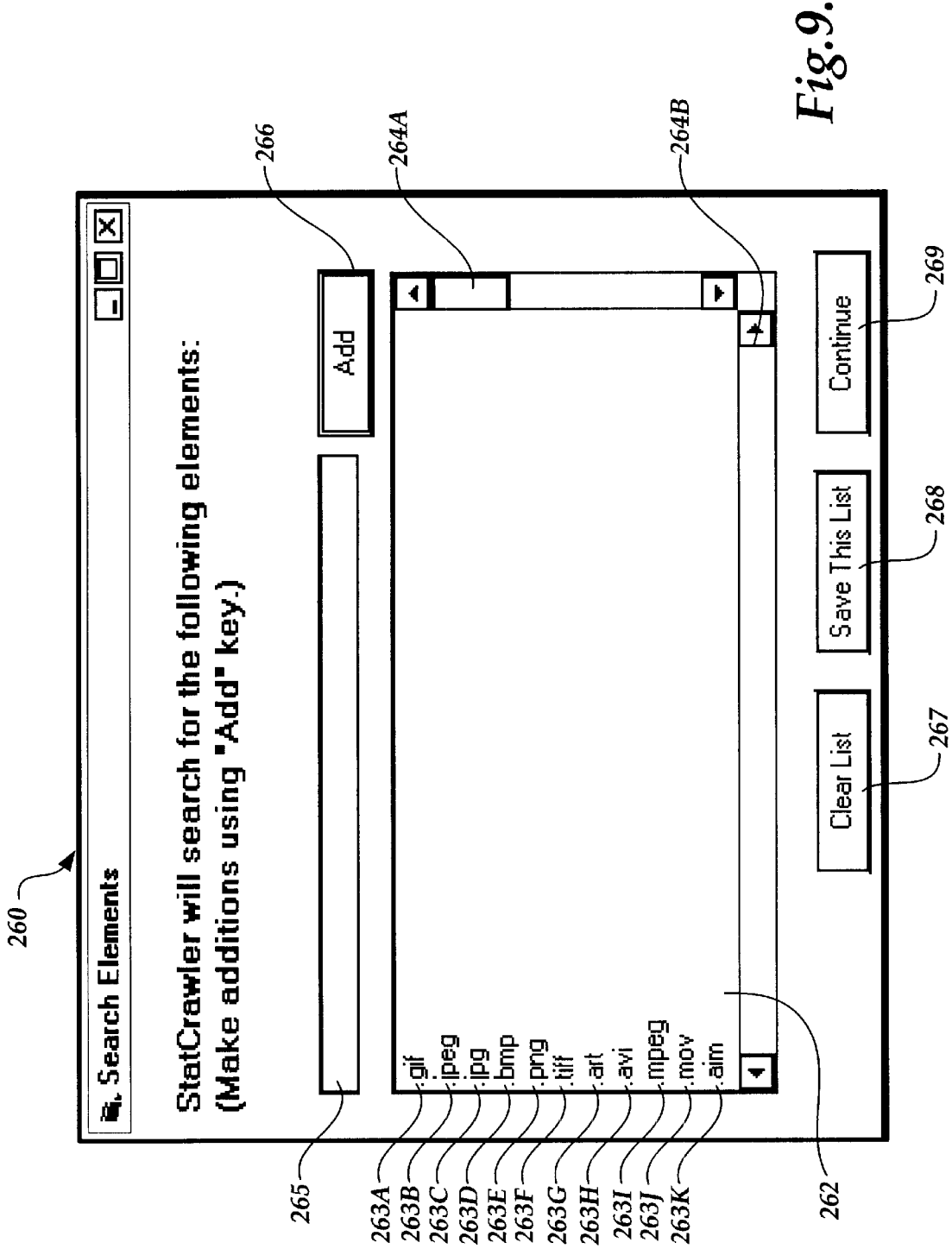
FIG. 9 is an exemplary user interface for viewing and modifying query criteria.

FIG. 6 illustrates in detail the logic used to perform block 154 of obtaining analysis criteria from an existing file. The logic begins in a block 170 and proceeds to a block 172, where the name of the analysis criteria file is obtained. In an actual embodiment of the present invention the user specifies the name of the analysis criteria file using a user interface formed in accordance with the present invention. Once the name of an existing analysis criteria file is obtained, the logic proceeds to a block 174, where the specified analysis criteria file is retrieved from memory 22. In an actual embodiment of the present invention, analysis criteria are stored in text files. However, it will be appreciated that the analysis criteria may be stored in other ways, such as in a database. Once the analysis criteria has been obtained, the logic proceeds to a block 176, where the user is provided with a capability to modify the analysis criteria. It will be appreciated that the mechanism for modifying the analysis criteria can be performed in a variety of ways. In an actual embodiment of the present invention, the user is presented with a user interface containing the necessary components to modify the existing analysis criteria, as illustrated in FIG. 9 and described later. The logic then proceeds to a decision block 178, where a test is made to determine if the analysis criteria should be saved. In an actual embodiment of the present invention, the user indicates whether the analysis criteria should be saved.

If in decision block 178 it is determined that the analysis criteria should not be saved, the logic for obtaining analysis criteria from an existing file ends in a block 190. If, however, in decision block 178 it is determined that the analysis criteria should be saved, an identification under which the analysis criteria is to be saved must be obtained. In an actual embodiment of the present invention, a save user interface is provided. The save user interface allows the user to save the analysis criteria using the existing file name, a different existing file name, or a new file name. If in decision block 178 it is determined that the analysis criteria should be saved, the logic proceeds to a decision block 180 where a test is made to determine if the analysis criteria should be saved using the existing name. If in decision block 180 it is determined that the analysis criteria should be saved using the existing name, the logic proceeds to a block 182 where the current analysis criteria is saved in memory 22 using the existing name. If it is determined in decision block 178 that the analysis criteria should be saved, but it is determined in decision block 180 that the analysis criteria should not be saved using the existing name, the logic proceeds to a block 184 where a name for storing the analysis criteria is obtained. The logic then proceeds to a decision block 186 where a test is made to determine if there is already an existing file with the specified name. If in decision block 186 it is determined that there is not a file in existence with the specified file name, the logic proceeds to block 182 where the analysis criteria is stored in memory 22 using the specified file name. If in decision block 186 it is determined that there is already an existing file with the specified name, the logic proceeds to a decision block 188 where a test is made to determine if the existing file should be overwritten. In an actual embodiment of the present invention, if there is already an existing file with the specified name, a user interface is provided that asks the user if the existing file should be overwritten with the current analysis criteria. If in decision block 188 it is determined that the existing file should be overwritten, the logic proceeds to block 182 where the analysis criteria is stored in memory 22 using the specified name. If, however, in decision block 188 it is determined that the existing file should not be overwritten, the logic returns to decision block 178 to determine if the analysis criteria should be saved. After the analysis criteria has been modified, if desired, and saved using the specified name 182, if appropriate, the logic for. obtaining analysis criteria from an existing file ends in block 190.

Returning to FIG. 5, if in decision block 152 it is determined that analysis criteria should not be obtained from an existing file, the logic proceeds to another decision block 156 where a test is made to determine if analysis criteria should be created by the user. If it is determined in decision block 156 that analysis criteria should be created by the user, the logic proceeds to a block 158 where analysis criteria is obtained from the user.

Figure 7:
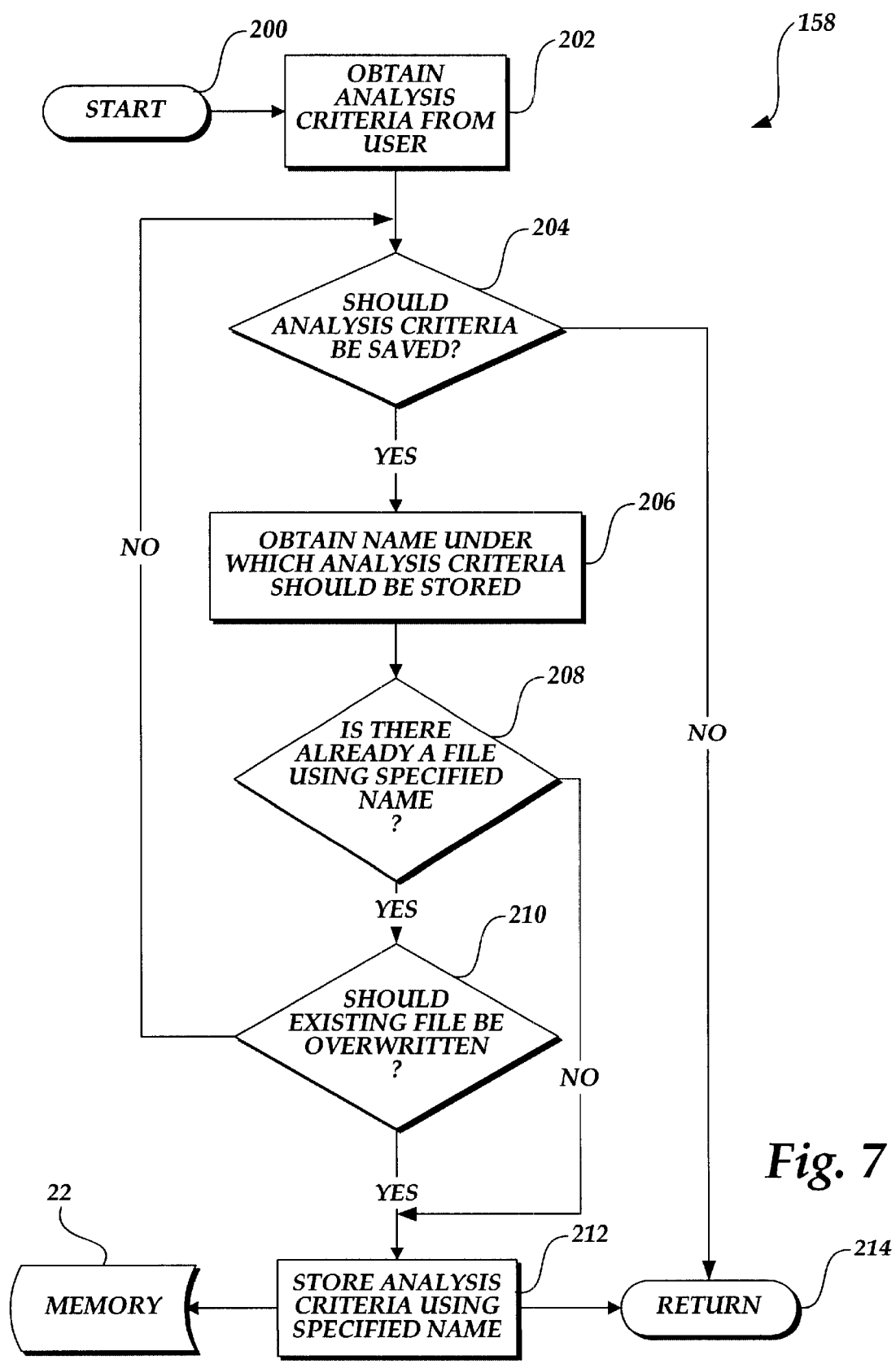
FIG. 7 is a flow diagram illustrating in further detail the logic used to obtain analysis criteria from a user.

FIG. 7 illustrates in detail the logic used to perform block 158 of obtaining analysis criteria from a user. The logic begins in a block 200 and proceeds to a block 202 where the analysis criteria is obtained from the user. In an actual embodiment of the present invention, a user interface is provided that allows the user to enter analysis criteria. After the user has provided the analysis criteria, the logic proceeds to a decision block 204 where a test is made to determine if the analysis criteria created by the user should be saved. In an actual embodiment of the present invention, the user determines whether the analysis criteria should be saved, by selecting a save option on a suitable user interface.

If in decision block 204 it is determined that the analysis criteria should not be saved, the logic for obtaining analysis criteria from a user ends in a block 214. If in decision block 204 it is determined that the analysis criteria should be saved, the logic proceeds to a block 206 where a name is obtained under which the analysis criteria should be stored. Preferably, the user provides the name for storing the analysis criteria using a suitable user interface. After the name under which the analysis criteria should be stored is obtained, the logic proceeds to decision block 208 where a test is made to determine if there is already data stored using the specified name. If there is no file using the specified name, the logic proceeds to a block 212 where the analysis criteria is stored in memory 22 using the specified name. If there is already data stored using the specified name, the logic proceeds to a decision block 210 where a test is made to determine whether the existing file should be overwritten with the current analysis criteria. In an actual embodiment of the present invention, a suitable user interface is provided so that the user can specify whether the existing file should be overwritten. If in decision block 210 it is determined that the existing file should be overwritten, the logic proceeds to block 212 where the analysis criteria is stored in memory 22 using the specified name. If, however, in decision block 210 it is determined that the existing file should not be overwritten, the logic returns to decision block 204 to determine if the user specified analysis criteria should be saved. After the analysis criteria is saved, if appropriate, the logic proceeds to block 214 where the logic for obtaining analysis criteria from a user ends.

Returning to FIG. 5, if in decision block 152 it is determined that analysis criteria should not be obtained from an existing file and in decision block 156 it is determined that the user should not create the analysis criteria, the logic proceeds to a block 160 where default analysis criteria is obtained.

Figure 8:
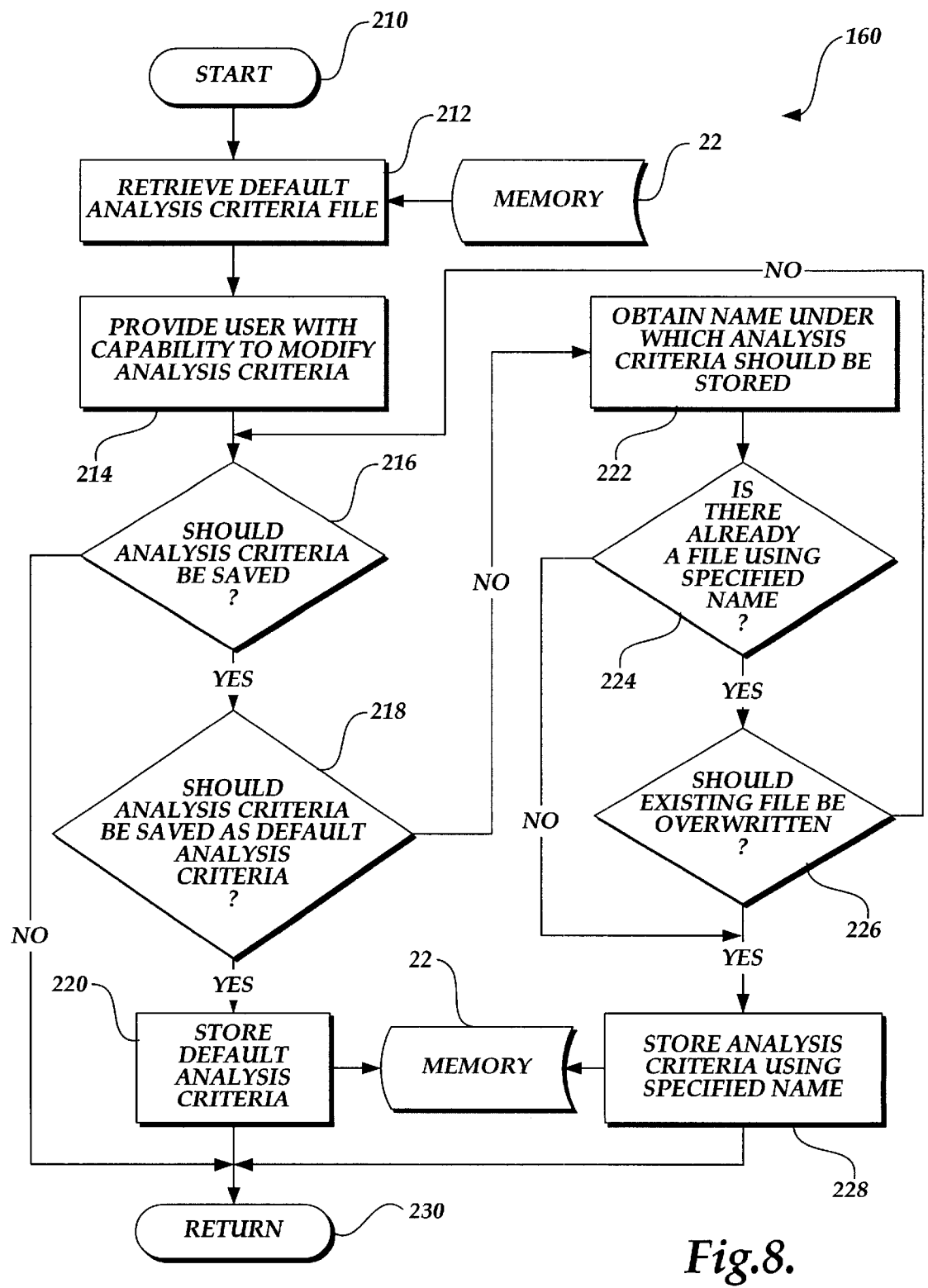
FIG. 8 is a flow diagram illustrating in further detail the logic used to obtain analysis criteria from a default set of analysis criteria.

The logic for obtaining default analysis criteria 160 is illustrated in detail in FIG. 8. The logic in FIG. 8 begins in a block 210 and proceeds to a block 212 where the default analysis criteria is retrieved from memory 22.

FIG. 9 illustrates an example user interface for viewing and modifying analysis criteria in accordance with the present invention. The modify analysis criteria user interface 260 includes an analysis criteria window 262 that contains a list of analysis criteria 263A–263K. Scrollbars 264A and 264B are provided for viewing contents of the analysis criteria window 262 that are not currently visible. The analysis criteria window 262 illustrated in FIG. 9 initially contains the analysis criteria that are currently defined as the default analysis criteria. In the example illustrated in FIG. 9, the default analysis criteria contains elements typically included in HTML files, such as ".gif" files 263A. An analysis criterion box 265 and an add button 266 are also included so that the user can add additional analysis criteria. Upon entering data in the analysis criterion box 265, and pressing the add button 266, the data in the analysis criterion box is added to the analysis criteria listed in the analysis criteria window 262. In the example illustrated in FIG. 9, a clear button 267 is provided for removing all of the contents currently displayed in the analysis criteria window 262. In an alternative embodiment, a delete button is provided for deleting a selected item or selected items in the analysis criteria window 262. The user may save the contents of the analysis criteria window 262 by means of a save button 268. In an actual embodiment of the present invention, pressing the save button causes a save user interface to be displayed. The save user interface allows the user to save the analysis criteria as the default analysis criteria, using an existing file name, or using a new file name. The user indicates that all of the desired modifications have been made by pressing a continue button 269. While the example in FIG. 9 illustrates a user interface for viewing and modifying the default analysis criteria, it will be appreciated that the same user interface can be used for the displaying and modifying of analysis criteria obtained from the user or from an existing file. In the case of analysis criteria created by the user, the analysis criteria window 262 will initially be empty. If the analysis criteria is to be obtained from an existing file, the contents of the existing file will initially be displayed in the analysis criteria window 262.

Returning to FIG. 8, after the default analysis criteria have been retrieved 212, the logic proceeds to a block 214 where the user is provided with a capability to modify the default analysis criteria. After the user has modified the default analysis criteria, if desired, the logic proceeds to a decision block 216 where a test is made to determine if the analysis criteria should be saved. If in decision block 216 it is determined that the analysis criteria should not be saved, the logic proceeds to a block 230 where the logic for retrieving default analysis criteria ends. If in decision block 216 it is determined that the analysis criteria should be saved, the logic proceeds to a decision block 218 where a test is made to determine if the analysis criteria should be saved as the default analysis criteria. If in decision block 218 it is determined that the analysis criteria should be saved as the default analysis criteria, the logic proceeds to a block 220 where the current analysis criteria is saved in memory 22 as the default analysis criteria.

If it is determined in decision block 216 that the analysis criteria should be saved, but it is determined in decision block 218 that the analysis criteria should not be saved as the default analysis criteria, the logic proceeds to a block 222 where a name for storing the analysis criteria is obtained. The logic then proceeds to a decision block 224 where a test is made to determine if there is already an existing file with the specified name. If in decision block 224 it is determined that there is not a file in existence with the specified file name, the logic proceeds to a block 228 where the analysis criteria is stored in memory 22 using the specified name. If in decision block 224 it is determined that there is already an existing file with the specified name, the logic proceeds to decision block 226 where a test is made to determine if the existing file should be overwritten. If in decision block 226 it is determined that the existing file should be overwritten, the logic proceeds to block 228 where the analysis criteria is stored in memory 22 using the specified name. If, however, in decision block 226 it is determined that the existing file should not be overwritten, the logic returns to decision block 216 to determine if the analysis criteria should be saved. After the analysis criteria has been modified, if desired, and saved, if appropriate, the logic proceeds to block 230 where the logic for obtaining analysis criteria using the default analysis criteria ends.

Returning to FIG. 5, regardless of the method used to obtain analysis criteria, the logic proceeds to a block 162 where the logic for obtaining analysis criteria ends. Returning to FIG. 4, after the analysis criteria has been obtained 122, the logic proceeds to a block 124 where an analysis site list is obtained. In an actual embodiment of the present invention the user selects the method of obtaining the site list. The user may choose to obtain the site list in any one of the following ways: (i) from an existing site list; (ii) by creating the site list; or (iii) by randomly selecting the sites on the site list.

Figure 10:
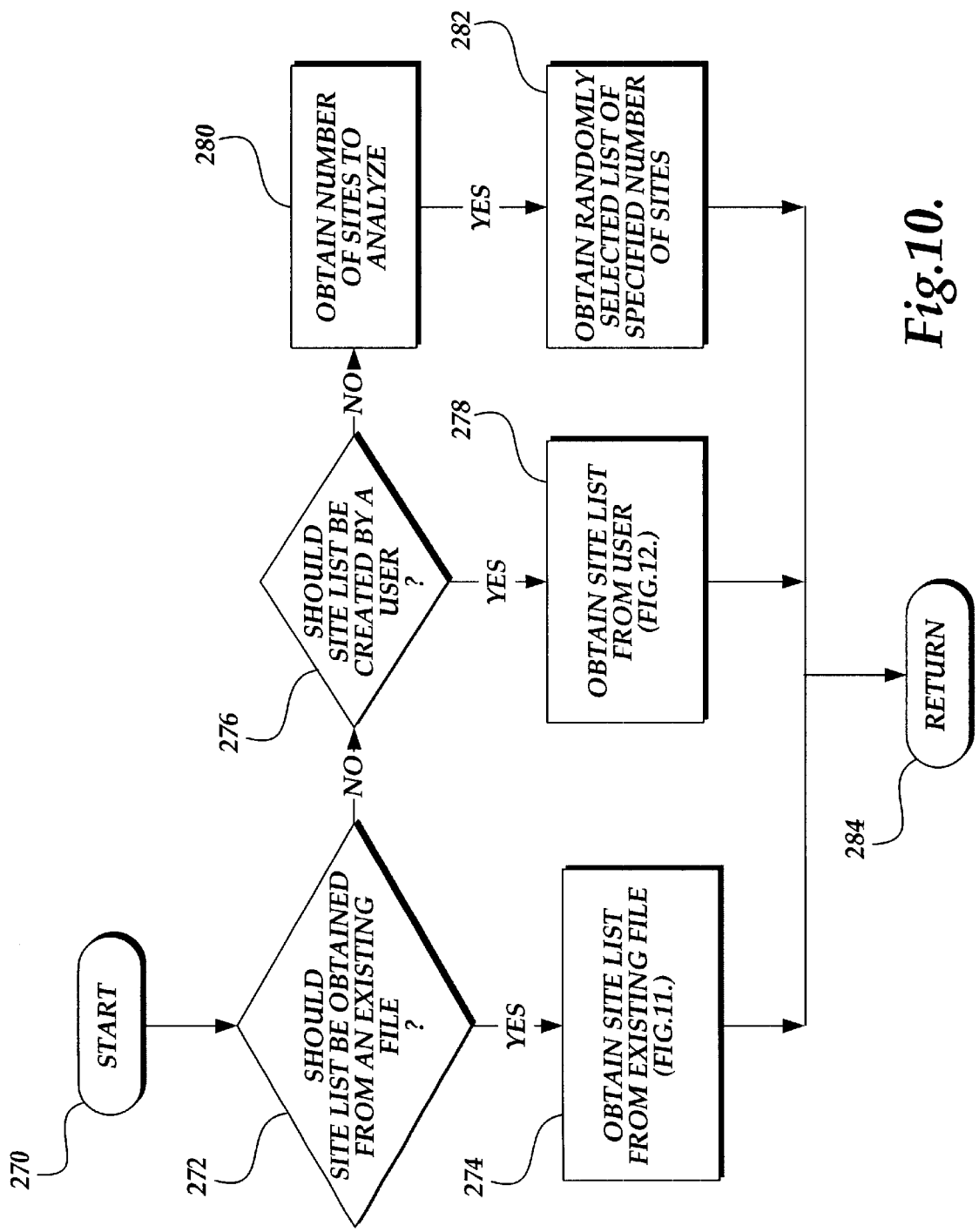
FIG. 10 is a flow diagram showing in detail the logic used to obtain a list of sites from which to obtain data to analyze in accordance with the present invention.

FIG. 10 illustrates in detail the logic of block 124 of obtaining an analysis site list. The logic begins in a block 270 and proceeds to a decision block 272 where a test is made to determine if the site list should be obtained from an existing file. If in decision block 272 it is determined that the site list should be obtained from an existing file, the logic proceeds to a block 274 where the site list is obtained from an existing file.

Figure 11:
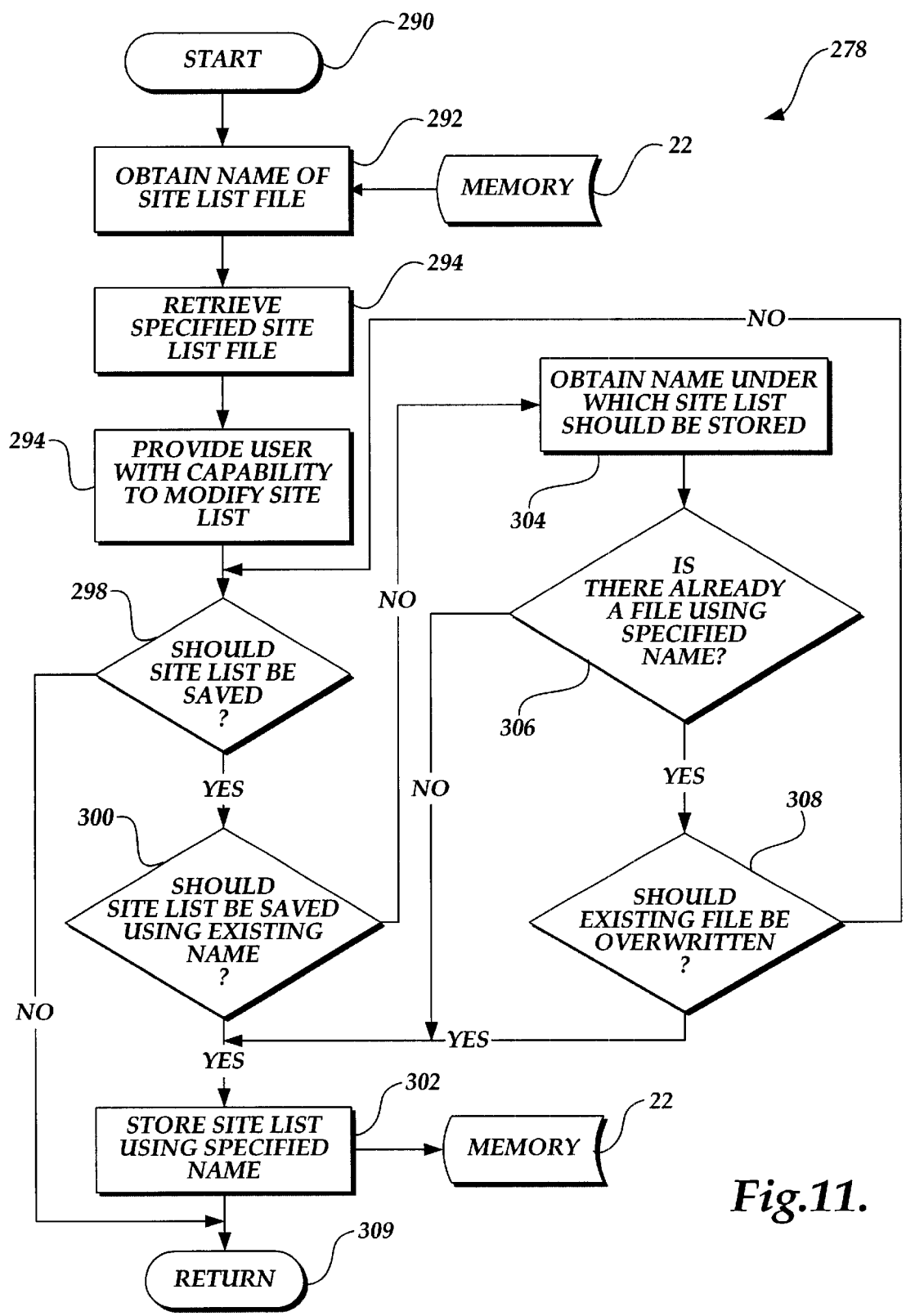
FIG. 11 is a flow diagram illustrating in further detail the logic used to obtain a site list from an existing file.

FIG. 11 illustrates in detail the logic used to obtain the site list from an existing file. The logic begins in a block 290 and proceeds to a block 292 where the name of the site list file is obtained. In an actual embodiment of the present invention, a user interface is provided that contains a list of existing site list files from which the user may select the desired site list file. Once the name of the site list file is obtained, the logic proceeds to a block 294 where the specified site list is retrieved from memory 22. Once the site list has been retrieved, the logic proceeds to a block 296 where the user is provided with the capability to modify the site list via a suitable user interface, such as one similar to the user interface for modifying analysis criteria illustrated in FIG. 9. The logic then proceeds to a decision block 298 where a test is made to determine if the site list should be saved, as specified by the user via a suitable user interface.

If in decision block 298 it is determined that the site list should not be saved, the logic for obtaining the site list from an existing file ends in a block 309. If in decision block 298 it is determined that the site list should be saved, the logic proceeds to a decision block 300 where a test is made to determine if the site list should be saved using the existing name. If in decision block 300 it is determined that the site list should be saved using the existing name, the logic proceeds to a block 302 where the current site list is saved in memory 22 using the existing name.

If it is determined in decision block 298 that the site list should be saved, but it is determined in decision block 300 that the site list should not be saved using the existing name, the logic proceeds to a block 304 where a name for storing the site list is obtained. The logic then proceeds to decision block 306 where a test is made to determine if there is already an existing file with the specified name. If in decision block 306 it is determined that there is not a file in existence with the specified file name, the logic proceeds to block 302 where the site list is stored in memory 22 using the specified file name.

If in decision block 306 it is determined that there is already an existing file with the specified name, the logic proceeds to a decision block 308 where a test is made to determine if the existing file should be overwritten, as indicated by the user via a suitable user interface. If in decision block 308 it is determined that the existing file should be overwritten, the logic proceeds to block 302 where the site list is stored in memory 22 using the specified name. If, however, in decision block 308 it is determined that the existing file should not be overwritten, the logic returns to decision block 298 to determine if the site list should be saved. After the site list has modified, if desired, and saved, if appropriate, the logic for obtaining the site list from an existing file ends in block 309.

Returning to FIG. 10, if in decision block 272 it is determined that the site list should not be obtained from an existing file, the logic proceeds to a decision block 276 where a test is made to determine if the site list should be created by a user. If it is determined that the site list should be created by a user, the logic proceeds to a block 278 where the site list is obtained from the user.

Figure 12:
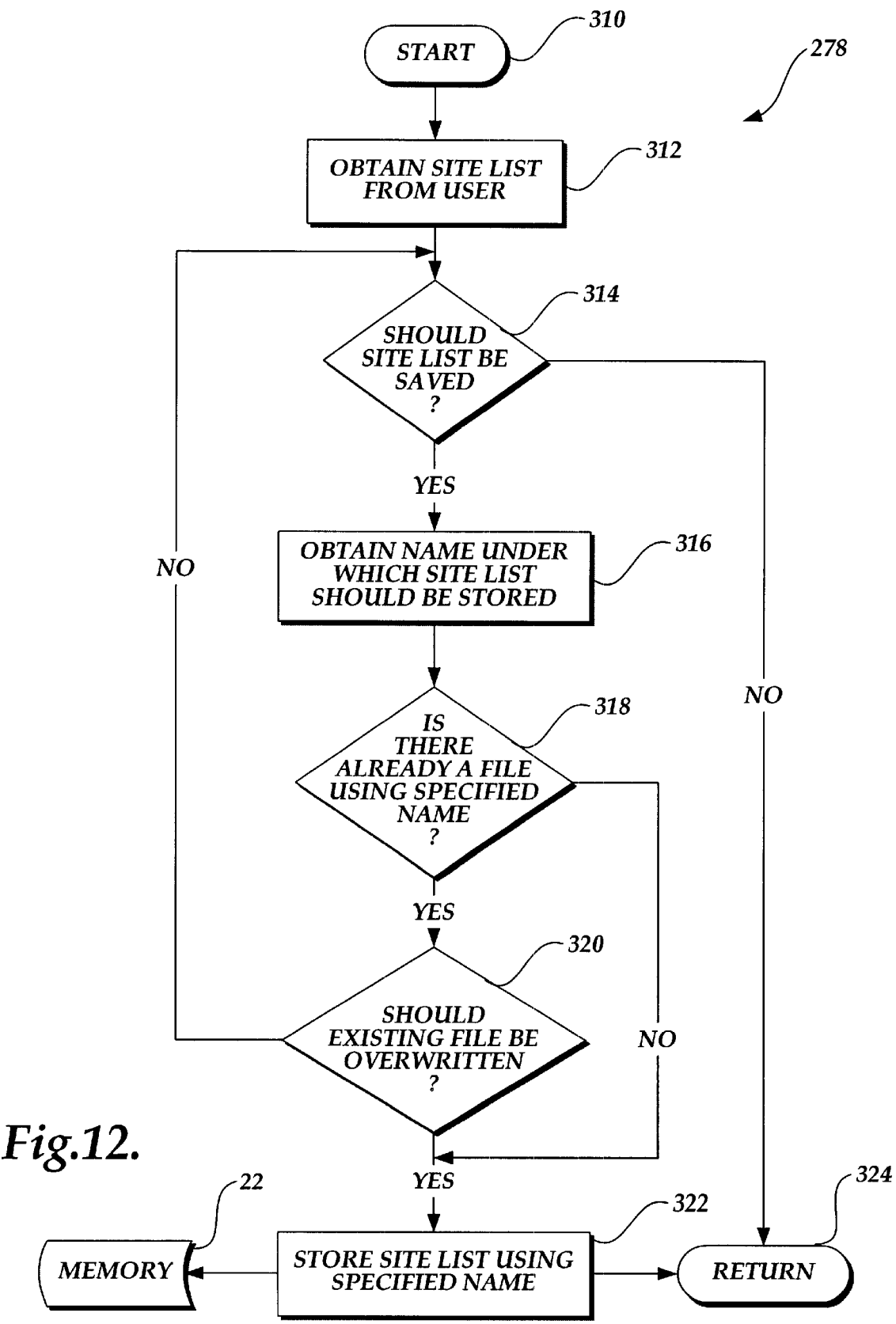
FIG. 12 is a flow diagram illustrating in further detail the logic used to obtain the site list from a user.

The logic to obtain the site list from a user 278 is illustrated in detail in FIG. 12. The logic begins in a block 310 and proceeds to a block 312 where a list of sites is obtained from the user via a suitable user interface. Once the user has provided the list of sites, the logic proceeds to decision block 314 where a test is made to determine if the site list should be saved.

If in decision block 314 it is determined that the site list should not be saved, the logic proceeds to a block 324 where the logic to obtain the site list from a user ends. If, however, in decision block 314 it is determined that the user created site list should be saved, the logic proceeds to a block 316 where a name for storing the site list is obtained. The logic then proceeds to a decision block 318 where a test is made to determine if there is already an existing file with the specified name. If in decision block 318 it is determined that there is not a file in existence with the specified file name, the logic proceeds to a block 322 where the site list is stored in memory 22 using the specified file name. If in decision block 318 it is determined that there is already an existing file with the specified name, the logic proceeds to a decision block 320 where a test is made to determine if the existing file should be overwritten based on user input.

If in decision block 320 it is determined that the existing file should be overwritten, the logic proceeds to block 322 where the site list is stored in memory 22 using the specified name. If, however, in decision block 320 it is determined that the existing file should not be overwritten, the logic returns to decision block 314 to determine if the site list should be saved. After the site list has been created by the user, and saved, if appropriate, the logic proceeds to block 324 where the logic for obtaining the site list from a user ends.

Returning to FIG. 10, if it is determined that the list of sites should neither be obtained from an existing file (no in decision block 272) nor from the user (no in decision block 276), the list of sites is randomly selected. In order to obtain a list of randomly selected sites, the logic proceeds to a block 280 where the number of sites to analyze is obtained. In an actual embodiment of the present invention, a user interface is provided in which the user enters the number of sites to analyze. Once a number of sites to analyze is obtained, the logic proceeds to a block 282 where a list of randomly selected sites for the number of sites specified is determined. While in an actual embodiment of the present invention, the "YAHOO" random site selection utility is used to acquire the list of randomly selected sites, it will be appreciated that other ways of randomly selecting sites can be used. Regardless of the method of determining the site list, the logic then proceeds to a block 284 where the logic for obtaining the site list ends.

Returning to FIG. 4, once the analysis criteria and the analysis site list have been obtained (blocks 122 and 124, respectively), the logic proceeds to a block 126 where the site to query is set to the first site in the site list. The logic then proceeds to a block 128 where the specified site (in this case, the first site in the site list) is queried. Querying a site is comprised of accessing the site over the Internet by means of the site's URL. The contents of the queried site are then downloaded to the computer 20 in a block 130. Once the contents of the site specified by the URL have been downloaded to the user's computer 20, the logic proceeds to a block 132 where data from the site are analyzed.

Figure 13:
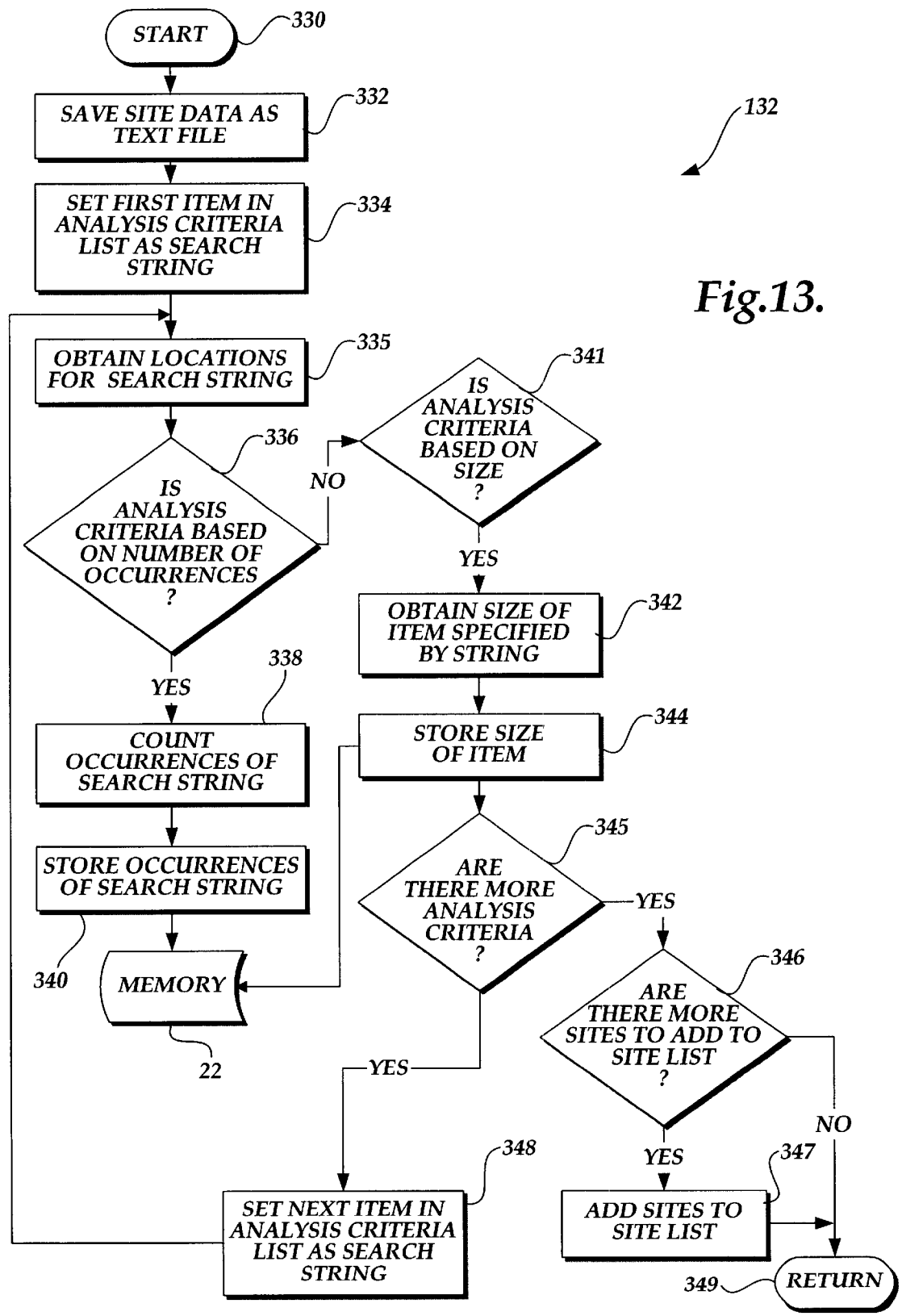
FIG. 13 is a flow diagram illustrating in detail the logic used to analyze data received from a site on the site list in accordance with the present invention.

FIG. 13 illustrates in detail the logic of block 132 of analyzing site data. The logic begins in a block 330 and proceeds to a block 332 where the site information is saved as a text file. The logic then proceeds to a block 334 where the first item in the analysis criteria list is designated as the search string. The logic then proceeds to a block 335 where the locations of the search string are obtained. There are many possible search string locations, including: (1) any text in the HTML page; (2) a tag name; (3) an attribute for a specific tag name; (4) an attribute value for a specified tag name and attribute; and (5) a combination of any of the above. An example of a combination search string location is a count of the <meta> tags that have a name attribute where the attribute value is equal to "generator", and a content attribute where the attribute value contains the string "FrontPage". This example counts the number of pages that were created by Microsoft FrontPage, since these pages usually contain a tag <meta name="generator" contents="Microsoft FrontPage 3.0">. As can be seen by the preceding example, the search string can be required to be an exact match or a subset. In the example it was required that the attribute value for the meta name attribute be an exact match, i.e., equal to "generator", whereas the string for the content attribute value, "FrontPage" could be contained anywhere within the attribute value. The determination of search string locations may be pre-determined or user selectable. For example, search string locations may be pre-determined or user selectable. For example, search string locations may be predetermined to be any text in the HTML page. Alternatively, for each search string, a user may specify the search location.

Analysis can be the counting of the number of occurrences of the analysis criterion, determination of the size(s) of the occurrences of the criterion, or both. For example, if the analysis criterion is ".gif," the results reported can be the number of ".gif" files included in the site data, the size of each ".gif" file included in the site data, a total size for all of the ".gif files found at the site, or some combination thereof. Other examples of analysis based on size include the size of HTML tables and the size of the HTML file(s) found in the site data. After the location(s) of the search string have been determined, the logic proceeds to a decision block 336 where a test is made to determine if the analysis criteria is based on the number of occurrences of the search string. In an actual embodiment of the present invention, analysis is only based on the number of occurrences of analysis data. In an alternate embodiment, for each analysis criterion, the user specifies the desired analysis method (e.g., count of occurrences of analysis criterion, size for individual items, total size, or some combination thereof). If the analysis criteria is based on the count of occurrences, the logic proceeds to a block 338 where the occurrences of the search string in the text file are counted. After the occurrences of the search string are counted, the logic proceeds to a block 340 where the counted number of occurrences of the search string are stored in memory 22. In an actual embodiment of the present invention, an "EXCEL" spreadsheet is used for storing the number of occurrences of each of the analysis criteria found at each site in the site list.

Whether or not it was determined that analysis criteria should include the count of occurrences of the search string in decision block 336, the logic proceeds to a decision block 341 where a test is made to determine if analysis criteria should be based on size. If in decision block 341 it is determined that analysis criteria is based on size, the logic proceeds to block 342 where the size is determined for the item specified by the search string. The size data is then stored in memory 22 in a block 344.

Regardless of whether the analysis criteria was analyzed by determining the count of occurrences of the search string 338, the size of the data specified by the search string 342, or both, the logic next proceeds to a decision block 345 where a test is made to determine if there are more analysis criteria. If there are more analysis criteria, the logic proceeds to a block 348 where the search string is set to next item in the analysis criteria list. The logic then returns to block 335 where the blocks of 335–344 are repeated for determining and storing analysis information for each of the analysis criteria until in decision block 345 it is determined that there are no more analysis criteria. When the end of the analysis criteria list has been reached, as determined in decision block 345, the logic moves to a decision block 346 where a test is made to determine if there are more sites to add to the site list. This test allows links to be analyzed. In an actual embodiment of the invention, links are not analyzed, and thus the test in decision block 346 will always produce a no response. In an alternate embodiment, links are followed, thus producing a yes response if links are found on the page being analyzed. In yet another embodiment, links may be added to the site list if they are to a remote site, while links to other pages within the same site are not added to the site list, thereby avoiding the possibility that the analysis will be biased in favor of data obtained from a large site. If in decision block 346 it is determined that there are more sites to add to the site list, the logic moves to a block 347 where sites are added to the site list. Due to the fact that the site list is being appended dynamically, the site list can potentially grow infinitely, therefore a limit on the size of the site list should be specified. Preferably, there is a default site list limit that can be modified by the user. Regardless of the outcome of the test of decision block 346, the logic for analyzing site data then ends in a block 349.

Returning to FIG. 4, after the analysis criteria has been analyzed for the specified site 132, the logic proceeds to a decision block 134 where a test is made to determine if there are more sites in the site list. If there are more sites in the site list, the logic proceeds to a block 136 where the next site to query is set to the next site on the site list. The logic then returns to block 128 where the next site on the site list is queried. The steps of querying the site (block 128), getting the site data (block 130) and analyzing the site data (block 132) are repeated for each site in the site list until the end of the site list is reached as determined in decision block 134. In an actual embodiment of the present invention, only the data found in the HTML files at the sites on the site list is analyzed. In an alternate embodiment, if any links are found in the data, the HTML files found at the linked sites are also included in the analysis. After all of the sites in the site list have been analyzed (no in decision block 134), the logic proceeds to a block 138 where the analysis results are processed.

Figure 14:
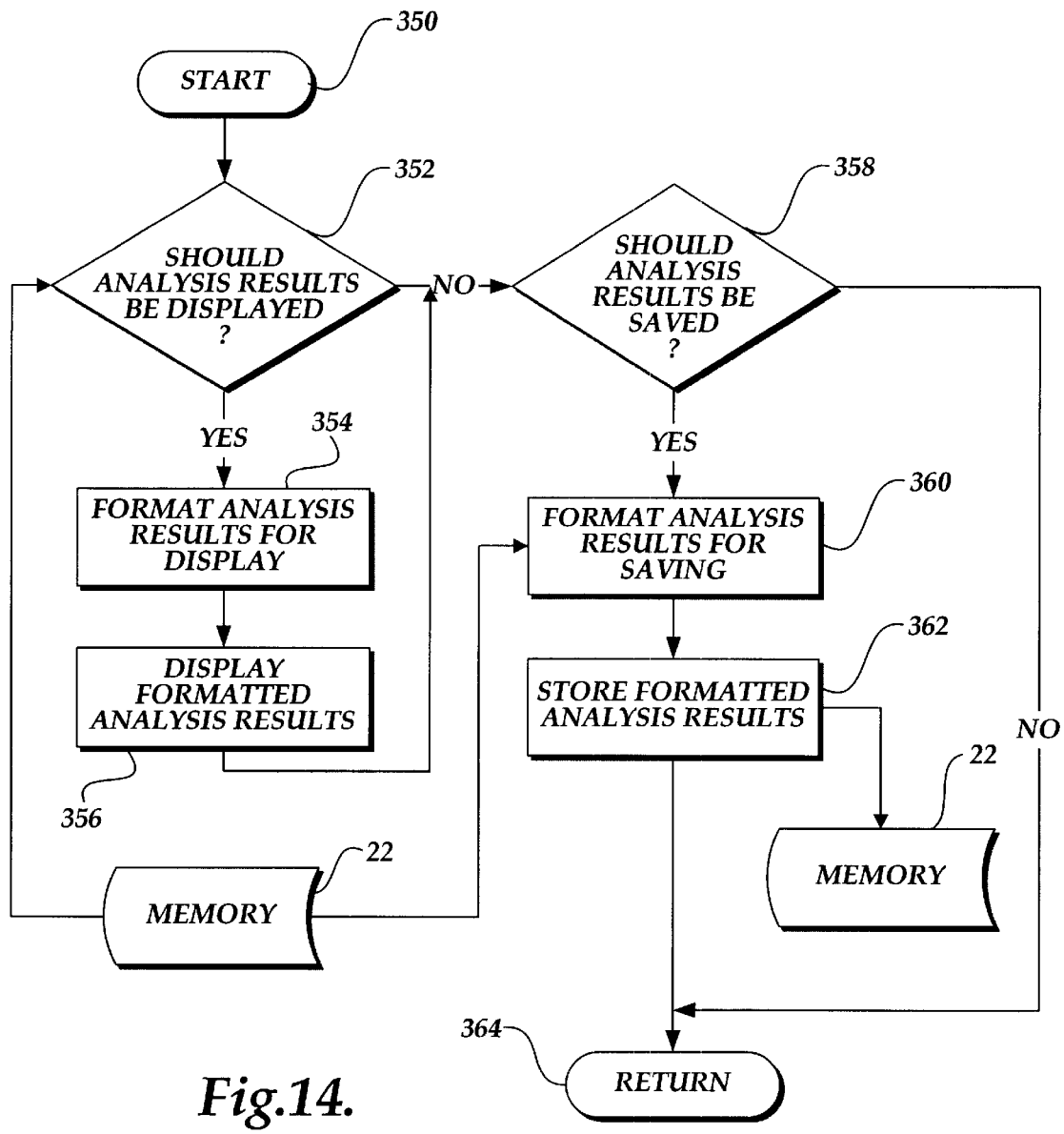
FIG. 14 is a flow diagram illustrating in detail the logic used to process Internet analysis results in accordance with the present invention.

FIG. 14 illustrates in detail the logic used to process analysis results 138 in accordance with the present invention. The logic for FIG. 14 begins in a block 350 and proceeds to a decision block 352 where a test is made to determine if the results of the Internet analysis should be displayed. In an actual embodiment of the present invention, the results are always displayed. In an alternative embodiment, the user specifies whether the results should be displayed. If in decision block 352 it is determined that the results should be displayed, the logic proceeds to a block 354 where the results previously stored in memory 22 (in blocks 340 and 344 in FIG. 13) are retrieved and formatted for display.

It will be appreciated that the results can be displayed using a variety of formats. FIG. 15 is an example of a display 370 of the results of an Internet analysis performed in accordance with the present invention. The results display 370 includes summary information about the related analysis, such as, who conducted the analysis query 371, the date the analysis query was conducted 372, the start time of the analysis query 373, the mechanism chosen to obtain sites for analysis (e.g., random) 375 and the number of sites analyzed 376. Following the summary information, the results of the Internet analysis are displayed. The results include a header line 378 that provides captions for columns of analysis information. The header line 378 is followed by an analysis information line for each of the sites analyzed (379A–379K). The analysis information line for each of the sites analyzed includes the site name and the Uniform Resource Locator (URL) for the site. After the site name and URL, the analysis results are displayed, in the illustrated example there is a count for each of the analysis criteria at the related site. In the actual embodiment of the present invention illustrated in FIG. 15, an "EXCEL" spreadsheet is used to store and display the Internet analysis results.

Returning to FIG. 14, after the results are formatted 354, the logic proceeds to a block 356 where the formatted results are displayed. Regardless of whether or not it is determined that the results of the Internet analysis should be displayed in decision block 352, the logic proceeds to another decision block 358 where a test is made to determine if the results of the Internet analysis should be stored. In an actual embodiment of the present invention, the user determines whether the results of the Internet analysis should be saved. Preferably, the user also provides a name under which the Internet analysis results are to be stored. If it is determined in decision block 358 that the results of the Internet analysis should be stored, the logic proceeds to a block 360 where the results previously stored in memory 22 are retrieved and formatted for storage. In an actual embodiment of the present invention, the format for storing results of an Internet analysis are the same as the format for displaying the Internet analysis, for example using an "EXCEL" spreadsheet. The results are then stored in memory 22 in a block 362. After the Internet analysis results have been displayed, if appropriate, and stored, if appropriate, the logic for processing Internet analysis results ends in a block 364.

Returning to FIG. 4, after the Internet analysis results have been processed 138, the logic for performing an Internet analysis ends in a block 140. Returning to FIG. 2, after an Internet analysis has been performed, the logic proceeds to block 90 where the results of the new analysis are compared to the existing analysis specified in block 84. The logic used to compare results of Internet analyses 90 is illustrated in detail in FIG. 3, described above. If in decision block 82 it is determined that results of different analysis should not be compared, the logic proceeds to a decision block 92 where a test is made to determine if an Internet analysis should be performed. If it is determined that an Internet analysis should be performed, the logic proceeds to block 88 where a new Internet analysis is performed. The logic used to perform an Internet analysis 88 is illustrated in detail in FIG. 4, described above. After an Internet analysis 88 has been performed, if appropriate, or a comparison of analyses 90 has been performed, if appropriate, the logic of an Internet analyzer formed in accordance with the present invention ends in a block 94.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of analyzing data currently stored at network sites, comprising:
   (a) maintaining a site list of said network sites to be analyzed remotely from said network sites; and (b) for each of said network sites in said site list:
  (i) obtaining an identity of a network site to be analyzed from said site list;
  (ii) obtaining a query criterion;
  (iii) retrieving a data file from the network site to be analyzed;
  (iv) searching for the query criterion in the retrieved data file; and
  (v) storing the results of said search as an analysis of the retrieved data file according to the query criterion.

2. The method of claim 1, wherein the site list comprises a plurality of sites.

3. The method of claim 2, wherein said network sites in said site list are randomly selected.

4. The method of claim 3, wherein a maximum number of randomly selected sites is determined by a user.

5. The method of claim 2, wherein said network sites in said site list are determined by a user.

6. The method of claim 5, further comprising saving said site list.

7. The method of claim 2, wherein the network sites contained in said site list are determined by an existing site list.

8. The method of claim 7, further comprising modifying the existing site list.

9. The method of claim 8, further comprising saving the modified site list.

10. The method of claim 1, further comprising:
  (a) obtaining additional query criteria; and
  (b) for each of said network sites in said site list:
    (i) retrieving a data file from each of said network sites in said site list,
    (ii) searching for said additional query criteria in said data file, and
    (iii) storing the results of said search as an analysis of said data file according to said additional query criteria.

11. The method of claim 10, wherein the additional query criteria are determined by a user.

12. The method of claim 11, further comprising saving the additional query criteria.

13. The method of claim 10, wherein the additional query criteria are determined by an existing list of query criteria.

14. The method of claim 13, further comprising modifying the existing list of query criteria.

15. The method of claim 14, further comprising saving the modified list of query criteria.

16. The method of claim 10, wherein the additional query criteria are determined by a default list.

17. The method of claim 16, wherein the default list is modifiable by a user.

18. The method of claim 17, further comprising saving the modified default list.

19. The method of claim 1, wherein searching for the query criterion comprises counting occurrences of the query criterion in the data file.

20. The method of claim 1, wherein searching for the query criterion comprises determining the size of the data contained within the data file specified by the query criterion.

21. The method of claim 1, further comprising reporting the analysis of the retrieved data file according to the query criterion to a user.

22. The method of claim 1, further comprising saving the analysis of the retrieved data file according to the query criterion.

23. The method of claim 1, further comprising comparing the analysis of the retrieved data file according to the query criterion to an existing analysis of the query criterion.

24. The method of claim 23, further comprising reporting the differences between the analysis of the retrieved data file according to the query criterion and the existing analysis of the retrieved data file according to the query criterion.

25. The method of claim 1, wherein searching for the query criterion in the data file, comprises:
  (a) converting the data file to a text file; and
  (b) searching for the query criterion in the text file.

26. The method of claim 25, wherein the text file includes HTML tags and wherein only occurrences of the query criterion located within an HTML tag are analyzed.

27. The method of claim 1, further comprising:
  (a) locating all links in the retrieved data file;
  (b) retrieving a linked data file identified by each of the links in the retrieved data file;
  (c) analyzing the query criterion in each of the linked data files; and
  (d) storing the analysis of the query criterion found in the linked data files as part of the analysis of the retrieved data file.

28. The method of claim 27, wherein retrieving a linked data file identified by the links in the data comprises:
  (a) determining whether each link is a local or remote link; and
  (b) retrieving a linked data file from each of the remote links.

29. A computer-readable medium having computer-executable instructions for performing the method recited in any one of claims 1–28.

30. A computer-controlled apparatus capable of performing the method recited in any one of claims 1–28.

* * * * *

UNITED STATES PATENT AND TRADEMARK OFFICE
CERTIFICATE OF CORRECTION

PATENT NO. : 6,463,455 B1
DATED : October 8, 2002
INVENTOR(S) : C.R. Turner et al.

It is certified that error appears in the above-identified patent and that said Letters Patent is hereby corrected as shown below:

Column 1,
Line 8, "specifically a" should read -- specifically, to a --
Line 21, "hyper-links" should read -- hyperlinks --
Line 51, "erably" should read -- erably, --
Line 64, "Preferably ," should read -- Preferably, --
Line 67, "tion" should read -- tion, --

Column 2,
Line 14, "tag. For" should read -- tag; for --
Line 20, "itself, for" should read -- itself; for --
Line 35, "suitable. for" should read -- suitable for --

Column 4,
Line 57, "discussion either" should read -- discussion, either --

Column 5,
Line 62, "displaying the changes" should read -- and displaying the changes --

Column 6,
Line 53, "the.analysis" should read -- the analysis --
Line 53, "criteria has" should read -- criteria have --

Column 7,
Line 43, "for. obtaining" should read -- for obtaining --

Column 10,
Line 55, "has modified" should read -- has been modified --

Column 12,
Line 32, " ".gif files" should read -- ".gif" files --

Column 13,
Line 2, "to next item" should read -- to the next item --
Line 26, "grow infinitely," should read -- grow infinitely; --
Line 67, "such as, who" should read -- such as who --

Column 14,
Line 12, "displayed, in" should read -- displayed. In --

UNITED STATES PATENT AND TRADEMARK OFFICE
CERTIFICATE OF CORRECTION

PATENT NO. : 6,463,455 B1
DATED : October 8, 2002
INVENTOR(S) : C.R. Turner et al.

It is certified that error appears in the above-identified patent and that said Letters Patent is hereby corrected as shown below:

<u>Column 16,</u>
Line 24, "file, comprises" should read -- file comprises --

Signed and Sealed this

Twenty-fifth Day of March, 2003

JAMES E. ROGAN
*Director of the United States Patent and Trademark Office*